(12) United States Patent
Kim (10) Patent No.: US 7,311,842 B2
(45) Date of Patent: Dec. 25, 2007

(54) LIGNOCELLULOSE-BASED ANION-ADSORBING MEDIUM (LAM) AND PROCESS FOR MAKING AND USING SAME FOR THE SELECTIVE REMOVAL OF PHOSPHATE AND ARSENIC ANIONIC CONTAMINANTS FROM AQUEOUS SOLUTIONS

(75) Inventor: Ju Young Kim, Madison, WI (US)

(73) Assignee: H2O Technologies, LLC, Valdosta, GA (US)

( * ) Notice: Subject to any disclaimer, the term of this patent is extended or adjusted under 35 U.S.C. 154(b) by 71 days.

(21) Appl. No.: 10/708,001

(22) Filed: Jan. 31, 2004

(65) Prior Publication Data

US 2005/0098503 A1   May 12, 2005

(51) Int. Cl.
C02F 1/28 (2006.01)
C02F 1/58 (2006.01)

(52) U.S. Cl. .................. 210/670; 210/683; 210/906; 210/911

(58) Field of Classification Search .......... 210/670, 210/683, 911, 906, 907; 252/180
See application file for complete search history.

(56) References Cited

U.S. PATENT DOCUMENTS

| | | | |
|---|---|---|---|
| 1,297,028 A | 3/1919 | Soraas | 530/500 |
| 3,872,002 A | 3/1975 | Musgrove | 210/711 |
| 3,903,074 A | 9/1975 | Van Reesema | 536/31 |
| 3,931,003 A * | 1/1976 | Jorgensen | 210/669 |
| 4,200,735 A | 4/1980 | Sano et al. | 536/30 |
| 4,432,921 A | 2/1984 | Haars et al. | 264/109 |
| 4,869,735 A | 9/1989 | Miyazawa et al. | 95/133 |

(Continued)

FOREIGN PATENT DOCUMENTS

DE  24 27 425 A1  6/1973

(Continued)

OTHER PUBLICATIONS

Unnithan et al., Ability of Iron (III)-loaded carboxylated polyacrylamide-grafted sawdust to remove phosphate ions from acqueous solution and fertilizer industry wastewater: adsorption kinetics and isotherm studies. J. Applied Polymer Science, vol. 84, 2541-2553 (2002).

(Continued)

*Primary Examiner*—Fred G. Prince
(74) *Attorney, Agent, or Firm*—John P. Sinnott; Landgale Vallotton, LLP (57) ABSTRACT

A lignocellulose-based anion-adsorbing medium (LAM) and process for making and using same for selectively removing phosphates and arsenic contaminants from aqueous solutions is disclosed. Making the LAM comprises (a) dissociating cations such as Fe and Al, from their counterions by adding a chemical compound containing said cations to water and acidifying; (b) pelletizing a lignocellulose; (c) adsorbing the cations to the lignocellulose by bringing the lignocellulose into contact with the solution of step (a) and incubating; and, (d) exposing the lignocellulose of step (c) to an alkaline fixing agent to replace hydrogens (H) of the hydroxyl groups of the lignocellulose with the adsorbed cations to produce the LAM with a positive charge. The LAM may be used to selectively and cost-effectively remove phosphate and arsenic contaminants from aqueous solutions by retaining them at the Fe or Al on the LAM.

7 Claims, 3 Drawing Sheets

U.S. PATENT DOCUMENTS

| | | | |
|---|---|---|---|
| 5,045,210 | A | 9/1991 | Chen et al. |
| 5,314,638 | A | 5/1994 | Morine et al. ............... 252/184 |
| 5,411,569 | A | 5/1995 | Hjersted ........................ 71/24 |
| 5,447,603 | A | 9/1995 | Michalowski et al. |
| 5,492,723 | A | 2/1996 | Sanderson et al. .......... 427/244 |
| 5,492,759 | A | 2/1996 | Eriksson et al. ............. 428/375 |
| 5,736,064 | A | 4/1998 | Edamura et al. .............. 252/74 |
| 5,907,037 | A | 5/1999 | Gujral et al. ................. 536/59 |
| 6,042,731 | A | 3/2000 | Bonniin ....................... 210/679 |
| 6,143,692 | A | 11/2000 | Sanjay et al. ................ 502/401 |
| 6,217,942 | B1 | 4/2001 | Bolle et al. ............... 427/385.5 |
| 6,318,021 | B1 | 11/2001 | Whiteley .......................... 47/9 |
| 6,342,191 | B1 | 1/2002 | Kepner et al. ............... 423/210 |
| 6,409,978 | B1 | 6/2002 | Faulkner et al. ................ 423/1 |
| 6,896,813 | B1 * | 5/2005 | Harthill et al. .............. 210/660 |

FOREIGN PATENT DOCUMENTS

| | | |
|---|---|---|
| DE | 27 08 974 A1 | 3/1976 |
| DE | 270 704 A1 | 4/1988 |
| DE | 286 805 A5 | 8/1989 |
| JP | JA 0084355 | 7/1978 |
| JP | JA 0115543 | 9/1979 |
| JP | J5 7019-98 | 7/1980 |
| JP | 363023934 A | 2/1988 |
| JP | JO 3008-495 A | 1/1991 |
| JP | JO 3114 587 A | 5/1991 |

OTHER PUBLICATIONS

Wigginton and Lenhart, Using iron-infused media and stormfilter technology for the removal of dissolved phosphorus from stormwater discharges. Unpublished manuscript.

STORMWATER INC. brochure entitled, Storm Filter.

Urano et al., Process development for removal and recovery of phosphorus from wastewater by a new adsorbent. 1. preparation method and adsorption capability of a new adsorbent. Ind. Eng. Chem. Res. 1991, 30:1893-1896.

Urano et al., Process development for removal and recovery of phosphorus from wastewater by a new adsorbent. 3. Desorption of phosphate and regeneration of adsorbent. Ind. Eng. Chem. Res. 1992, 31:1510-1513.

Urano et al., Process development for removal and recovery of phosphorus from wastewater by a new adsorbent. 4. Recovery of phosphate and aluminum from desorbing solution. Ind. Eng. Chem. Res. 1992, 31:1513-1515.

Baker et al., Laboratory development of permeable reactive mixtures for the removal of phosphorus from onsite wastewater disposal systems. Environ. Sci. Technol. 1998 32: 2308-2316.

Munoz et al., Arsenic adsorption by Fe(III)-loaded open-celled cellulose sponges. Thermodynamic and selectivity aspects. Environ. Sci. Technol. 2002 36:3405-3411.

Suvasis et al., Coparison of arsenic (V) and arsenic (III) sorption onto iron oxide minerals: implications for arsenic mobility. Environ. Sci. Technol. 2003, 37: 4182-4189.

Myers et al., Iron oxide sink method for extracting soil phosphorus: paper preparation and use. Soil Sci. Soc. Am. J. 61: 1400-1407 (1997).

Urano et al., Process development for removal and recovery of phosphorus from wastewater by a new adsorbent. 1. preparation method and adsorption capability of a new adsorbent. Ind. Eng. Chem. Res. 1991, 30: 1893-1896.

Deae-Dextran, data file from Amersham Biosciences. df 18-1151-76 AA, Nov. 2001, pp. 1-4.

* cited by examiner

LIGNOCELLULOSE-BASED ANION-ADSORBING MEDIUM (LAM) AND PROCESS FOR MAKING AND USING SAME FOR THE SELECTIVE REMOVAL OF PHOSPHATE AND ARSENIC ANIONIC CONTAMINANTS FROM AQUEOUS SOLUTIONS

CROSS REFERENCE TO RELATED APPLICATIONS

This application is entitled to the benefit of Korean Patent Application serial number KR-10-2003-0064186, filed 2003 Sep. 16 by applicant Ju Young Kim and entitled: Manufacturing method of lignocellulose media coupled with Fe or Al.

BACKGROUND OF INVENTION

Anionic contaminants in wastewater and other aqueous solutions pose significant environmental and health problems. For example, excessive levels of phosphate in seawater, freshwater, wastewater and sewage cause undesirable biological effects such as red tides and eutrophication. Arsenic in groundwater and mine wastewater threatens the health and lives of human beings, animals and plants when it is consumed. Therefore, there have been many efforts to remove these anionic contaminants from water.

With regard to phosphate removal, it is impossible to cost effectively remove this contaminant in cases of non-point source pollution, that is, in cases where the polluted water is drained from wide areas into rivers and the sea. Non-point source pollution streams are typically high volume streams with low concentrations of pollutants.

For point source pollution, where pollutants originate from specific points (e.g. industrial or domestic wastewater), current technologies include chemical precipitation, biological treatment, MBR (membrane Bio-coupled Reactor) method, ion exchange and absorption method.

The chemical precipitation method is widely used by small to medium sized sewage treatment plants to remove phosphate. However, at low concentrations, the efficiency of phosphate removal is low. Even at concentrations typical of domestic wastewater, removal efficiencies are typically less than 60 percent. In addition, this method generates a large amount of sludge, the disposal of which means extra cost.

Biological treatment is used by medium to large sized sewage treatment plants to remove phosphate. This method employs a biological pretreatment prior to the addition of coagulation/precipitation chemicals. It suffers from similar disadvantages as the chemical precipitation method discussed above.

The MBR method makes use of ultrafiltration membranes in a reactor design that allows for a continuous process as opposed to the batchwise precipitations in the methods described above. While this reactor technology is much more efficient in removing phosphate, it shares with the chemical precipitation and biological treatment technologies upon which it is based the disadvantage of producing concentrated sludge which must be removed from the reactor at intervals. It is also very expensive to install and maintain.

Ion exchange and reverse osmosis methods have been suggested as methods to remove arsenic in groundwater and mine wastewater. Semiconductor, electronics, and dyeing plants use ion exchange resins to remove a variety of charged contaminants. Because of the extremely high cost and limited capacity, wastewater pretreatment is required. This technology is appropriate only for specialized industrial purposes, and not for phosphate or arsenic removal in point/non-point source pollution. Reverse osmosis is similarly unsuited for such applications because it is very expensive and difficult to maintain.

For the foregoing reasons, there is a need for a means of removing anionic contaminants from aqueous solutions that is both highly efficient and cost-effective over a broad range of applications.

SUMMARY OF INVENTION

The present invention is directed to a lignocellulose-based anion-adsorbing medium (LAM) and its processes for synthesis and use that satisfy this need.

In one aspect of the present invention, a process for making the lignocellulose-based anion-adsorbing medium (LAM) with a positive charge is disclosed, comprising the steps of (a) dissociating cations selected from the group consisting of Fe and Al (or other divalent or trivalent cations with similar reactivity) from their counterions by adding a chemical compound containing said cations to water and acidifying; (b) pelletizing a lignocellulose; (c) adsorbing the cations to the lignocellulose having hydroxyl groups (—OH) by bringing the lignocellulose into contact with the solution of step (a) and incubating; and, (d) replacing hydrogens (H) of the hydroxyl groups of the lignocellulose with the cations to produce the LAM with a positive charge by incubating the lignocellulose of step (c) with an alkaline fixing agent.

In one version of the process for making the LAM, the anionic cations are Fe or Al.

Alternatively, instead of the lignocellulose being pelletized prior to the absorbing step (c), the LAM may be manufactured first using unpelletized lignocellulose, and the LAM itself subsequently fashioned into pellets.

In another aspect of the present invention, a process for treating a contaminated aqueous solution to remove one or more anionic contaminants therefrom is disclosed and comprises contacting the contaminated aqueous solution with a lignocellulose-based anion-adsorbing medium (LAM), made according to the process herein disclosed, and recovering a treated aqueous solution with reduced anionic contaminant content. The anionic contaminants may consist of phosphate, arsenic or other anionic contaminants. This process may further include regenerating the LAM after its contact with the contaminated aqueous solution by treating the LAM with an alkaline solution to remove the one or more anionic contaminants from the LAM and subsequently neutralizing the LAM with an acid to prepare it for reuse.

In one version of the method for using the LAM, the anion contaminants are phosphates or arsenic.

The reader is advised that this summary is not meant to be exhaustive. Further features, aspects, and advantages of the present invention will become better understood with reference to the following description, accompanying drawings and appended claims.

BRIEF DESCRIPTION OF DRAWINGS

For a better understanding of the present invention, reference may be made to the accompanying drawings, in which.

DETAILED DESCRIPTION

Overview.

The composition of the present invention is a lignocellulose-based anion-adsorbing medium (LAM) that can be used to remove anionic contaminants such as phosphate, arsenic or the like from aqueous solutions in a highly efficient and cost-effective manner. The capacity of the LAM, i.e. the amount of contaminant removed per mass of media, exceeds that of existing technologies. The efficiency of removal, i.e. the level to which contaminants' concentrations can be lowered, is superior to competing technologies. Sludge is not produced. The LAM can be regenerated and reused multiple times. Further, the LAM is manufactured by a simple and inexpensive process from lignocellulose, a safe and harmless natural material that is readily available at a very low cost.

The present invention discloses a process for making the LAM such that it will effectively and selectively remove anionic contaminants (e.g., phosphate and arsenate) from aqueous solutions (e.g., drinking water, sea water, freshwater, sewage, groundwater, and mine wastewater). Lignocellulose is commonly defined as a combination of lignin, cellulose and hemicellullose that strengthens plant cells. The term lignocellulose as it is used herein refers broadly to plant tissue, both woody tissues such as aspen and pine wood, and nonwoody tissues such as cotton and kenaf; to the main chemical constituents of plant tissue, such as cellulose, hemicellulose, starch, sugars, and lignin; and to products, preparations, and byproducts that contain the above referenced chemical constituents or their reaction products, such as paper, dextran, rayon, and pulping waste liquors. The lignocellulose is chemically modified so as to bestow it with a high density of positive charges. This is achieved by replacement of the hydroxyl hydrogens (H) of the lignocellulose with positively charged chemical moieties such as iron (Fe), aluminum (Al), calcium (Ca) or other divalent or trivalent cations with similar reactivities which may include, e.g., Mg, Mn, Mo, Co, Ni, or Zn.

One implementation of the invention is realized as follows. A chemical compound containing Fe or Al is added to water and the Fe or Al is dissociated from its counterion by adding acid. Next, lignocellulose is added to the above solution, where it adsorbs Fe or Al. Finally, an alkaline fixing solution or fixing gas is used to catalyze the chemical replacement of lignocellulose's hydroxyl H with Fe or Al. The result is a positively-charged lignocellulose-based anion-adsorbing medium (LAM).

The adsorption capacity of the LAM manufactured by this invention is greater than that of currently used media. In addition, the effectiveness and efficiency of anion contaminant removal by use of LAM is greater than that exhibited by other current technologies that are not media-based. Further, the LAM is highly selective for arsenic and phosphate. For example, LAM can be used to effectively remove arsenic in groundwater and mine wastewater, and phosphate in seawater, freshwater, and sewage. Further, by the regeneration process described herein, LAM can be regenerated to its original adsorption capacity and used for many adsorption-regeneration cycles, leading to great cost effectiveness.

Detailed Description Process for Making LAM.

This invention provides a process for making a lignocellulose-based anion-adsorbing medium (LAM) by which lignocellulose is chemically modified so as to bestow it with a high density of positive charges. This is achieved by replacement of the hydroxyl hydrogens (H) of lignocellulose with positively charged chemical moieties. For the sake of simplicity, the following describes the steps for achieving this for the specific cases in which LAM is manufactured using Fe or Al; however, it should be noted that similar results may be obtained by use of other positively charged chemical moieties such as, e.g., Mg, Ca, Mn, Mo, Co, Ni and Zn.

The steps by which a lignocellulose-based anion-adsorbing medium (LAM) with a positive charge is manufactured are, (a) dissociating cations from their counterions by adding a chemical compound containing said cations to water and acidifying; (b) pelletizing a lignocellulose; (c) adsorbing the Fe or Al cations to a lignocellulose having hydroxyl groups (—OH) by bringing the lignocellulose into contact with the solution of step (a) and incubating; and, (d) incubating the treated lignocellulose from the adsorbing step (c) with an alkaline fixing solution or gas that catalyzes the replacement of hydrogens (H) of the hydroxyl groups of the lignocellulose with Fe or Al cations to produce the LAM with a positive charge.

(a) Dissociating cations from their counterions by adding a chemical compound containing said cations to water and acidifying.

A chemical compound containing Fe or Al (or other divalent or trivalent cations with similar reactivity which may include, e.g., Ca, Mg, Mn, Mo, Co, Ni, Zn or the like) is added to water. Some examples of chemical compounds containing Fe or Al are: $FeI_2$, $FeCl_2$, $FeCl_3$, $FeBr_2$, $FeBr_3$, $FeF_2$, $FeF_3$, $FeSO_4$, $Fe_2(SO_4)_3$, $Fe(NO_3)_3$, $FePO_4$, $AlI_3$, $AlCl_3$, $AlBr_3$, $AlF_3$, $AlSO_4$, $Al_2(SO_4)_3$, $Al(NO_3)_3$, $AlPO_4$ and the like. This solution is acidified to the extent required to dissociate Fe or Al and to maintain them in the dissociated form. The concentration of Fe or Al and corresponding volume employed is chosen by reference to considerations well-known to those skilled in the art of chemistry to ensure that a sufficient but not overabundant amount of Fe or Al will be adsorbed onto the lignocellulose added in the adsorbing step (c) to bring about an efficient coupling reaction in step (d). For example, $FeCl_3$ or $AlCl_3$ at 0.01 3.0 M (molar concentration) dissociated by addition of acids such as HCl, $H_2SO_4$, $HNO_3$, and so on at 0.1 1.0 N (normal concentration) are effective conditions.

(b) Pelletizing a lignocellulose. Pelletized LAM may be made from pelletized lignocellulose media. In that case, the lignocellulose is pelletized prior to use at the adsorbing step (c).

Pellets may be manufactured from a variety of lignocelluloses, including wood, cotton fiber, liquified cellulose, and other lignocellulosic materials. For example, pelletized lignocellulose media may be produced by rolling a sheet of paper tightly until it makes a stick of proper diameter and pasting the end of the paper with a non-toxic, insoluble glue. The rolled paper stick may then be cut into suitable lengths. In this way pelletized lignocellulose media of various diameters and lengths may be made.

In another version, pellets may be constructed from cotton strings. The string is cut into suitable lengths, and a non-toxic insoluble glue is used to seal the cut ends and prevent unraveling. Because cotton contains fats that may interfere with the LAM-manufacturing process, pretreatment to remove these fats should be performed. Fats may be removed by treatment with an organic solvent or by boiling in water or in a slightly acidic aqueous solution.

In another version, pellets may be derived by milling natural lignocelluloses, e.g. corn cobs, and screening to obtain an appropriate size distribution of pellets. Natural pellets must be prewashed to remove easily leached components (hemicelluloses, soluble lignin, free sugars, etc.) prior to their use in the manufacture of LAM. Although these leachable components are in general non-toxic, they would interfere with the coupling of Fe or Al to non-leachable sites by competition and by physically blocking access to these sites.

The exact process whereby a LAM is manufactured from lignocellulosic pellets will vary depending upon the physical characteristics of the pellet. For example, to achieve optimal penetration of Fe or Al (step (c), below), incubation time must be varied inversely with pellet porosity. In addition, less porous pellets may demand higher vacuums for adequate penetration. Because of the demanding kinetics of the fixation step (step (d), below), incubation time of fixation may not be substantially varied; therefore, proper vacuum or pressure conditions (see step (d), below) are important.

The reader should note that, as an alternative to converting lignocellulosic pellets to LAM, it is possible in some cases to first convert the lignocellulose (unpelletized) to LAM and subsequently to generate the pellets out of the LAM product. For example, paper (in unpelletized form) may be first converted to LAM and then the LAM product subsequently pelletized by the process described above for pelletizing lignocellulose. Likewise, cotton fibers (unpelletized) may first be converted to LAM and the LAM product subsequently pelletized. This approach may obviate somewhat the problems discussed above with regard to achieving optimal penetration into the pellet.

(c) Adsorbing the cations to a lignocellulose having hydroxyl groups (—OH) by bringing the lignocellulose into contact with the solution of step (a) and incubating.

Lignocellulose is added to the above solution and incubated for a sufficient time to allow it to adsorb adequate quantities of Fe, Al, Ca or other cations used. As an alternative to dipping the lignocellulose into a vessel containing treatment solution, the solution may be applied by spraying it onto the lignocellulose. This can be very efficient when spraying occurs at high pressure. A vacuum treatment may also be employed at this step to facilitate penetration of the reagent into the lignocellulose matrix.

Vacuum treatment may be employed to remove pockets of gas from the lignocellulose undergoing treatment. These air pockets could otherwise block access of Fe or Al from many potential sites of attachment. The high capacity of LAM is based upon the even distribution of cations (i.e., Fe, Al, Ca or others) at a molecular level by virtue of the even distribution of the hydroxyl groups of lignocellulose. Therefore, an optimized vacuum treatment is important. The strength and duration of the vacuum treatment depend upon the physical characteristics of the lignocellulose undergoing treatment. For example, if the lignocellulose is in the form of a thin sheet of material, e.g. paper, then a brief treatment under low vacuum is sufficient, whereas if the lignocellulose is in a hardened pelletized form, more substantial treatment is required.

A wetting pretreatment with a water-miscible solvent whose surface tension is less than that of water, e.g methanol, ethanol, etc., may be performed on the lignocellulose prior to addition of the Fe or Al solution and application of vacuum. The lower surface tension of the prewetting solvent results in the formation of smaller air bubbles which more readily outgas. During incubation, a two-step process results in the nano-scale distribution of the Fe or Al. First, air bubbles are removed by the vacuum treatment. Second, the wetting solution is displaced by diffusion and dilution into the far larger aqueous treatment solution, bringing the Fe or Al into contact with the lignocellulosic hydroxyl groups. Alternatively, the surface tension of the treatment solution itself may be minimized by inclusion of a surfactant.

In some cases, vacuum treatment may not be required, but may be replaced with other treatment regimes which likewise have the effect of displacing trapped gases from the lignocellulose. Examples of alternative treatments include, e.g., prewetting alone, heating, boiling, sonication, pressurization, etc. Following this incubation step, the lignocellulose is typically dried prior to performance of step (d).

(d) Incubating the treated lignocellulose from the adsorption step (c) with an alkaline fixing solution or gas that catalyzes the replacement of hydrogens (H) of the hydroxyl groups of the lignocellulose with cations to produce the LAM with a positive charge.

A fixing solution or fixing gas is used to catalyze the chemical replacement of lignocellulose's hydroxyl H with cations (i.e., Fe, Al, Ca or others). An alkaline solution such as NaOH, KOH, Ca(OH)$_2$ or NH$_4$OH may be used for this purpose. For example, fixation may be achieved by incubation for 0.1 to 60 minutes, typically 0.2 5.0 minutes, in a solution of NH$_4$OH at 1.0 8.0 M.

A vacuum treatment may be employed to facilitate penetration of the solution into the lignocellulose matrix. Unreacted Fe or Al is removed from the LAM immediately after the prescribed incubation period by rinsing with water.

The considerations regarding use of a vacuum treatment are identical to those discussed above for the adsorbing step (c); however the kinetics of the fixation reaction pose additional technical difficulties. The step (d) treatment differs from the step (c) treatment in that the duration of incubation of the former must be carefully controlled. If the incubation period is too short, the coupling of the cations (Fe, Al, Ca or others) to the lignocellulosic hydroxyl groups will be incomplete, and a LAM of suboptimal capacity will be generated. If the incubation period is too long, excess cations (Fe, Al, Ca or others) will flocculate or participate within the lignocellulose matrix and block access to the molecularly dispersed cations (Fe, Al, Ca or others) that constitute the active removal sites, likewise resulting in a LAM with suboptimal capacity.

These demanding kinetics are the reason a treatment to dry the lignocellulose at the conclusion of the adsorption step (c) may be required. The rapid penetration of the fixing solution into the lignocellulose matrix is facilitated by the wicking properties of dried lignocellulose. For the case of wet lignocellulose, penetration must occur by diffusion, which may be too slow to bring the treatment into contact with all relevant sites within the narrow optimized timeframe required. For these reasons, a drying treatment is typically performed at the conclusion of the adsorption step (c).

As an alternative to incubation with an alkaline solution, fixation may be achieved by incubation with an alkaline gas. For example, fixation may be achieved by incubation for 0.5 to 120 minutes, typically 2 to 10 minutes, with NH$_4$OH gas at 1.0 8.0 M. A drying treatment is typically performed at the conclusion of the adsorbing step (c); otherwise, penetration would be limited by the rate of dissolution of the active agent into the wet matrix. Typically, a pressure treatment to facilitate optimal penetration of the fixing gas into the lignocellulose matrix is employed.

The fixing reaction is quenched by addition of an excess of water. Excess Fe or Al that was not fixed to the lignocellulose is washed out by rinsing with water. The LAM is then ready for use in the removal of anionic contaminants.

Figure 1A:
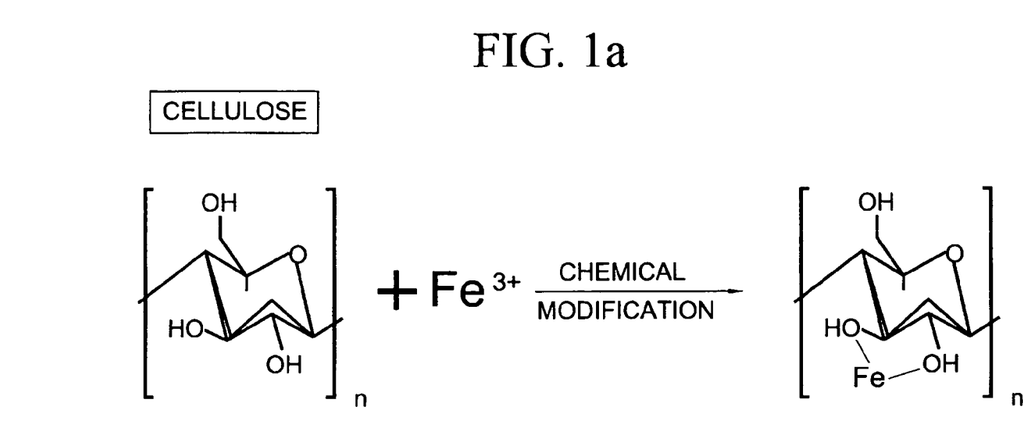
FIG. 1a depicts a cellulose reacted with Fe to form a LAM in which the Fe replaces the hydroxyl H of the cellulose.
Figure 1B:
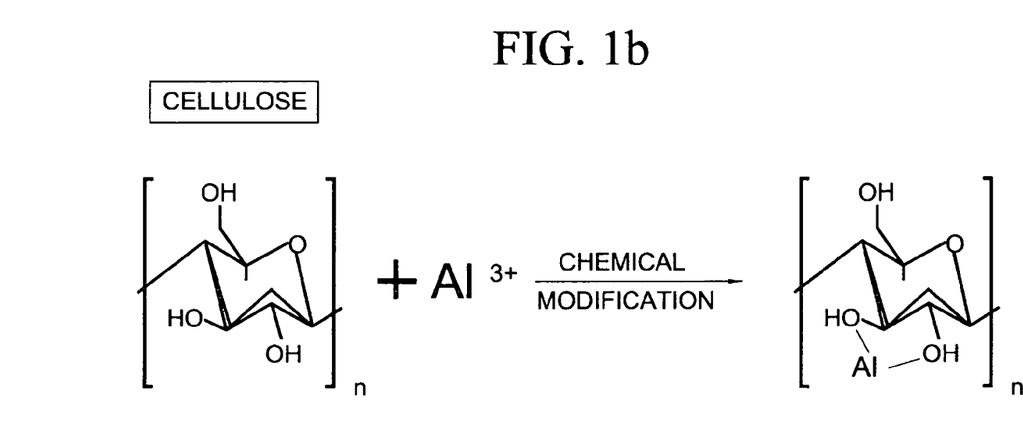
FIG. 1b depicts a cellulose reacted with Al to form a LAM in which the Al replaces the hydroxyl H of the cellulose.

By way of illustration, the reactions of Fe and Al with cellulose are diagrammed in FIGS. 1a and 1b respectively.

The hydroxyl hydrogens of cellulose are replaced with Fe or Al to form —OFe or —OAl moieties. Hemicelluloses may be modified in similar fashion. Because of the extremely dense arrangement of hydroxyl groups in cellulose and hemicellulose, the reaction generates a solid substrate with an extremely high charge density.

Figure 2A:
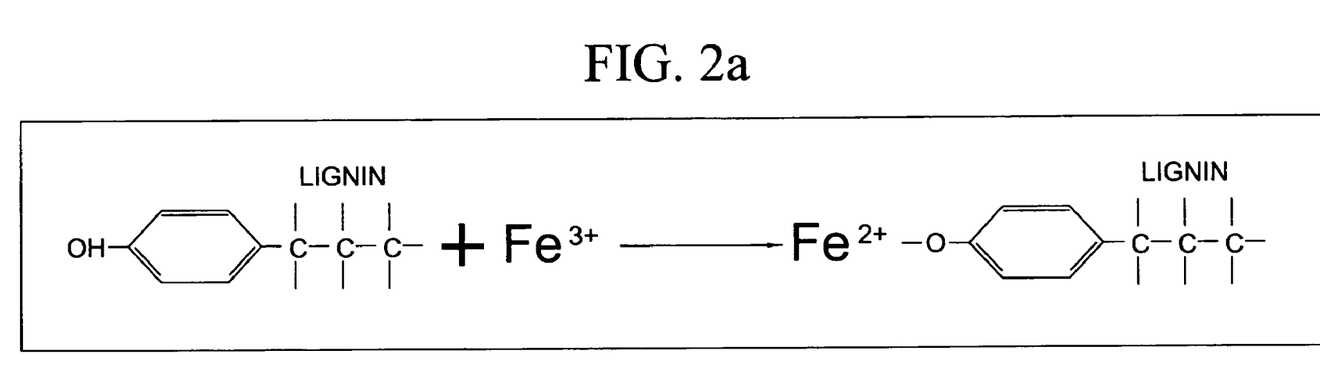
FIG. 2a depicts a lignin reacted with Fe to form a LAM in which the Fe replaces the hydroxyl H of the lignin coating.
Figure 2B:
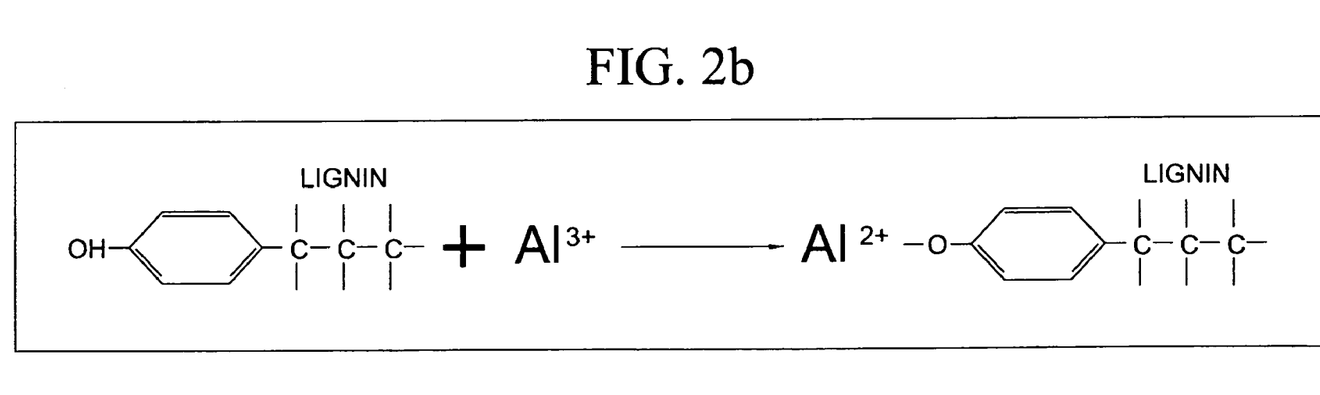
FIG. 2b depicts a lignin reacted with Al to form a LAM in which the Al replaces the hydroxyl H of the lignin coating.

The reactions of Fe and Al with lignin are diagrammed in FIGS. 2a and 2b, respectively. In this case, the groups subject to modification are phenolic hydroxyls.

EXAMPLES

The process for manufacturing LAM (Fe form) from nonpelletized lignocellulose was optimized as follows. Aqueous solutions of $FeCl_3$ ranging in concentration from 0.01 to 3.0 M were prepared. These solutions were adjusted to HCl concentrations ranging from 0.1 to 1.0 N. 170 mg paper (25×25×1 mm) was added to each solution and incubated for 0.1 2.0 hours. Paper samples were removed from these solutions and dried. Dried paper samples were then fixed with 1.0 8.0 M $NH_4OH$ for 0.1 10 minutes, after which the unreacted Fe was removed by rinsing with water. Vacuum treatments were employed during cation loading and fixation incubations.

The manufacture of LAM (Fe form) from pelletized lignocellulose was optimized as described above. The pelletized lignocellulose media consisted of a sheet of paper tightly rolled and glued into the form of a stick with a diameter of 2 mm and then cut into 5 mm long segments of about 30 mg each. The rest of the experiment is the same as described above except that it used pelletized media instead of nonpelletized lignocellulose media.

The manufacture of LAM (Al form) from nonpelletized and pelletized lignocellulose was accomplished as described above, except that aqueous solutions of $AlCl_3$ ranging in concentration from 0.01 to 3.0 M were used.

Detailed Description Process for Using LAM.

The process for treating a contaminated aqueous solution to remove an anionic contaminant such as phosphate, arsenic or the like therefrom, comprises contacting the contaminated aqueous solution with a lignocellulose-based anion-adsorbing medium (LAM), wherein the LAM has been formed by the steps disclosed above, and recovering a treated aqueous solution with reduced anionic contaminant content. The methods may further consist of regenerating the LAM after its contact with the contaminated aqueous solution by treating the LAM with an alkaline solution to remove the one or more anionic contaminants from the LAM and subsequently neutralizing the LAM with an acid to prepare it for reuse.

Contacting the contaminated aqueous solution with a lignocellulose-based anion-adsorbing medium (LAM), wherein the LAM has been formed by the steps disclosed above, and recovering a treated aqueous solution with reduced anionic contaminant content.

The LAM, in either its pelletized or non-pelletized form, may be placed in contact with contaminated aqueous solutions on both small and very large scales. Once the contaminated aqueous solution comes into contact with the LAM, the anionic contaminants (e.g. phosphate or arsenic) are retained at the Fe or Al on the LAM. In this way, the concentrations of these contaminants in the aqueous solution are lowered through contact with the LAM. The aqueous solution may then be circulated back to its original location, be it a small contained area or a larger body of water, or alternatively transferred to an alternative location for a use befitting its cleansed state.

The selectivity of LAM for arsenic and phosphate makes it extremely useful for the removal of these contaminants from waters which may contain a variety of other anions. This selectivity is an especially valuable characteristic for the removal of, for example, low concentrations of arsenic from groundwaters with very substantial levels of anions such as, e.g., chloride, sulfate or carbonate. In such a situation, the capacity of a nonselective anion-adsorbing medium for the target contaminant would be rapidly depleted by the binding of the competing anions. However, the selectivity of LAM is such that these potential competitors are not bound. Thus, even huge excesses of other anions such as, e.g., chloride, sulfate or carbonate do not substantially reduce the number of LAM binding sites that are available to remove arsenic and phosphate, and therefore remediation of these challenging waters can be achieved.

Different forms of LAM may be used as appropriate based upon the nature of the contaminated solution, the scale of the operation, and the availability of technological infrastructure. In the following discussion, capacity refers to the mass of a contaminant that a given mass of LAM will adsorb. Efficiency refers to the percentage of removal of a given contaminant by a given configuration of LAM. Note that a high capacity does not necessarily translate into a high efficiency: a given design could theoretically remove large quantities of a contaminant by removing only, for example, 50% of the contaminant from a high volume treatment stream. For the case of the removal of arsenic from drinking water, depending of course on the initial concentration of the water to be treated, high efficiencies may be required to reduce concentrations to levels safe for human consumption. Whereas capacity is a fundamental property of a given type of medium, efficiency is influenced both by the properties of the medium and the design of the system employing it.

Specific examples of the use of LAM to remove arsenic and phosphate from various aqueous media are described below.

Regarding arsenic removal, a preoxidation step may be of benefit for certain treatment streams. Nearly all treatment technologies exhibit a greater affinity for arsenic in its oxidized state, As(V), than in its reduced state, As(III). However, it is noteworthy that the highly efficient removal of even arsenic as As(III) is achieved by use of LAM. The development of other operational parameters, such as pH, bed volume, flow rate, etc., will be easily addressed by those skilled in the art.

LAM may be used to remove arsenic from groundwater, a non-point source application. A single-family point-of-use system in a technologically advanced setting would make use of LAM engineered to optimize capacity and removal efficiencies. For this situation, a membrane design would be optimal. The high head loss across the membrane could be easily overcome by pressurization. Contaminated water would be forced through small pores in a LAM matrix. This configuration maximizes the ratio of LAM surface area to treatment stream, thereby maximizing capacity and efficiency. Pre-filtration would be required to prevent fouling of the LAM system.

While such a membrane design could conceivable be used to remove arsenic in a small-scale water treatment plant as well, the scale of such a system is limited to relatively low volume applications because of the high head loss across the system. Pelletized LAM would be used in higher volume applications.

Pelletized LAM is used in a packed bed configuration. The size of the pelletized particle is important. Head loss and fouling problems are reduced with an increase in particle size; unfortunately, medium capacity and efficiency are likewise reduced with an increase in particle size. LAM beds may be operated in series or in parallel. The former configuration increases the efficiency of the system, but limits flow rates. Parallel operation increases throughput but has no effect on efficiency, unless it makes possible an accompanying reduction in the flow rate of the treatment stream.

Small particles of LAM (e.g., 1.0-10.0 mm) in a static bed design would be an appropriate design for water treatment plants of various sizes. Pre-filtration and pressurization would be required to prevent fouling and generate practical flow rates. Such a design could be used for single-family point-of-use applications as well.

Similar designs could also be used to treat point source arsenic waste streams such as mining wastes. Here, the economic trade-off would be between LAM capacity and pre-treatment cost. LAM in a membrane or small particle form provides more capacity than large particles would, but demands a more rigorous pre-treatment of the waste stream.

Pelletized LAM of larger particle sizes (ca. 10-30 mm) have less capacity, but can be utilized without pre-treatment and pressurization. Because of the relatively large interstitial spaces in the medium bed, particulates pass through with the treatment stream without fouling the LAM bed. Further, because of the low head loss across such a bed, a gravity feed design is feasible. This configuration of LAM would be useful in systems to remove arsenic from drinking water in developing countries, where in many cases the technologies discussed above are not available. A baffled sedimentation tank removes large particulates, and water for drinking is gravity fed from this tank through a bed of large-particle LAM. Such a design could be used for community or single-family systems.

An even simpler point-of-use solution for arsenic removal is gravity filtration of water for drinking directly into a pitcher. A reservoir at whose outlet is placed a cartridge of LAM is set atop a collecting vessel. The user then simply pours water to be treated into the reservoir and it gravity feeds into a pitcher.

In the case of phosphate removal, point sources may be treated using designs similar to those described above for water treatment plants. In most cases, waste streams of extremely high initial phosphate concentrations are first pre-treated to reduce these concentrations, and LAM would be employed in a final polishing step to further reduce concentrations to acceptable discharge levels.

LAM could be used in the treatment of animal waste generated by feedlot operations. Initial treatments may consist of anaerobic fermentation or ditch oxidation, with LAM employed to treat the aqueous effluent from these processes. Because the discharge requirements for release of phosphate into the environment are much less demanding than those for removal of arsenic in drinking water, efficiency is of less importance in this application.

Therefore, to avoid fouling and reduce technology costs, pelletized LAM of relatively large particle size would likely be the medium of choice.

Large-particle LAM is the medium of choice for remediation of urban non-point source phosphate pollution and of natural surface waters as well. In the former case, pelletized LAM would be packed into the distribution boxes of storm sewers, or installed in other locations in the flow path. Under normal conditions of low velocity flow, this treatment would substantially lower phosphate levels prior to discharge.

Remediation of rivers, lakes, and bays present huge problems of scale, but such undertakings are nevertheless justified when phosphate-driven eutrophication results in severe problems. Phosphate removal may be achieved by recirculating contaminated water through large static beds of LAM. In the case of rivers and bays, where mixing may be inadequate to allow for effective treatment by this means, the entire area may be exposed to LAM by use of a large mesh of LAM suspended from boats.

Regenerating the LAM after its contact with the contaminated aqueous solution by treating the LAM with an alkaline solution to remove one or more anionic contaminants from the LAM to which the anionic contaminants have been adsorbed, and subsequently neutralizing the LAM with an acid to prepare it for reuse. Though this process may be used to selectively remove either phosphate or arsenic contaminants, it should be understood by the reader that there will inevitably be some other anionic contaminants (i.e., non-phosphate or non-arsenic) adsorbed as well. These other adsorbed anionic contaminants will also be removed from the LAM by this regeneration process.

The LAM will accumulate anionic contaminants with use. Eventually, all available Fe or Al sites will be occupied by anions, with the result that no additional anions can be removed from the contaminated solution being treated. At this point, the capacity of the LAM has been exceeded, and break-through of contaminants occurs.

Depleted LAM may be regenerated by eluting the adsorbed anionic contaminants (e.g., phosphate, arsenic and/or other anionic contaminants) with an alkaline solution and then neutralizing the regenerated LAM with acid.

Alkaline solutions such as NaOH, KOH, $Ca(OH)_2$ and $NH_4OH$, and acid solutions such as HCl, $H_2SO_4$ and $HNO_3$ can be used for this purpose.

In the case of phosphate, elution with NaOH yields a "waste" product in the form of an alkaline phosphate fertilizer, a product with a positive value. Thus, when used to remove phosphate, the process is better than a zero discharge process in that it actually produces a product with a positive economic value.

In the case of arsenic, a low volume of highly concentrated arsenic is obtained, which must most probably be disposed of as toxic waste. It is possible that in some cases selective desorption treatments may be used to obtain a highly purified arsenic solution that would have a positive value; however, this may depend upon the characteristics of the waste stream.

The efficacy of LAM in removing phosphate and arsenic from various aqueous media are described below. The described results were obtained by testing Fe-loaded LAM.

The ability of LAM to remove phosphorus in the form of phosphate from water was tested as follows. 50 mL aliquots of water were brought to a concentration of 10.0 mg/L phosphorus with phosphoric acid and then incubated with LAM for 24 hours with shaking at 150 rpm. For assessment of nonpelletized LAM, a single 170-mg sheet was tested. For assessment of pelletized LAM, six 30-mg pellets were tested.

Batch treatment with nonpelletized LAM resulted in a lowering of the phosphorus concentration in water from 10.0 mg/L to 0.06 mg/L (>99% efficiency). In addition to demonstrating that removal of phosphate to very low levels can be achieved, this finding also demonstrates that the capacity of the LAM employed exceeds 2.95 mg phosphorus per gm LAM. The pelletized LAM treatment lowered the phosphorus concentration in water from 10.0 mg/L to 0.50 mg/L (95% efficiency), thereby demonstrating a capacity of at least 2.64 mg phosphorus per gm for the pelletized LAM.

The ability of LAM to remove phosphorus as phosphate from artificial seawater (Instant Ocean, Synthetic sea salt, Nitrate-Free, Phosphate-Free, Aquarium Systems Inc.) was tested by the same protocol. Batch treatment resulted in a lowering of the phosphorus concentration in seawater from 10.0 mg/L to 2.8 mg/L (72% efficiency) by use of nonpelletized LAM and to 2.5 mg/L (75% efficiency) using pelletized LAM. Given the preponderance of competing anions in seawater, this finding demonstrates the selectivity of LAM for the targeted contaminant.

The ability of LAM to remove arsenic from a complex matrix in which it is commonly found was assessed. The matrix chosen was leachate from wood treated with CCA (chromated copper arsenic, a common wood preservative). CCA leachates contain arsenic in both its As(III) and As(V) oxidation states. The test matrix was generated by extracting CCA-treated wood with water and adjusting the extract by dilution to give an arsenic concentration of ca. 10 mg/L. These arsenic solutions were treated with LAM as described above for the phosphate tests. Treatment with nonpelletized LAM lowered the arsenic concentration in the leachate from 10.6 mg/L to 0.05 mg/L (>99% efficiency) and treatment with pelletized LAM lowered it to 0.3 mg/L (>97% efficiency). This finding demonstrates that removal of arsenic from a complex matrix to very low levels can be achieved, and that the capacity of the LAM employed exceeds 3.0 mg arsenic per gm LAM. These findings are particularly significant with regard to the high capacity and efficiency of removal of arsenic in its As(III) oxidation state: in nearly all other treatment technologies, removal of As(III) is much more problematic than that of As(V).

Figure 3A:
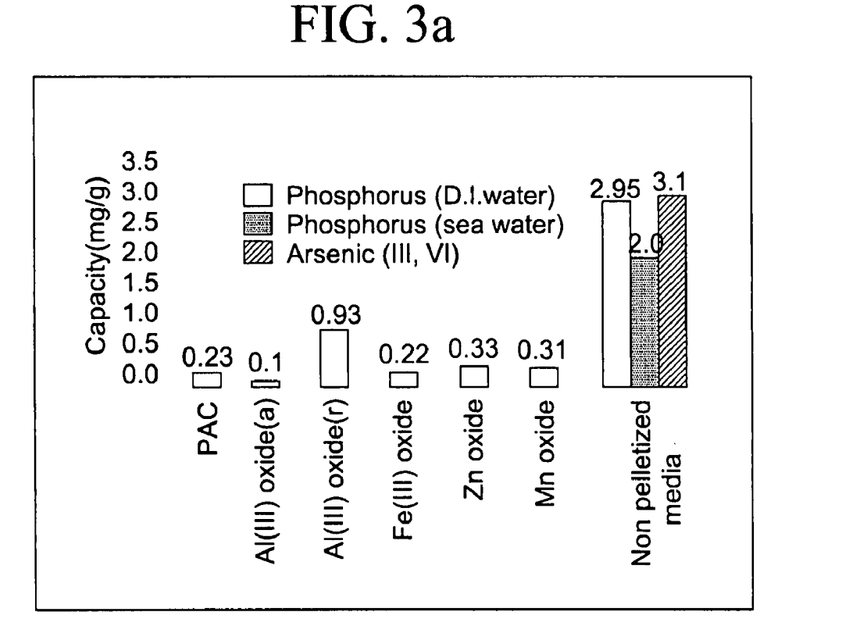
FIG. 3a presents the results of the adsorption experiment described in Example 6 using non-pelletized media; and, FIG. 3b presents the results of the adsorption experiment described in Example 6 using pelletized media.
Figure 3B:
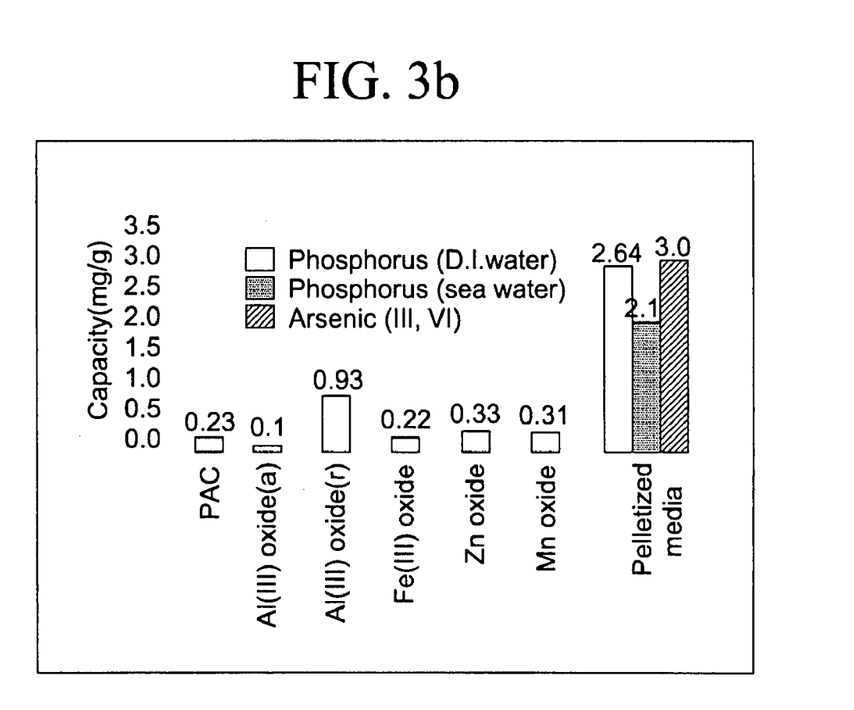

Commercial adsorbants were tested using the same protocols as described above for LAM testing. Results are compared to those obtained with LAM in FIGS. 3$a$ and $b$. The reader should note that the true capacities of LAM exceed those shown in FIGS. 3$a$ and $b$ by virtue of the fact that (with the exception of removal of phosphate from seawater) contaminant concentration was the limiting factor in the LAM experiments. For the commercial adsorbants, contaminant concentration was in no case limiting; therefore, the data shown do represent these adsorbents" true capacities.

To determine whether phosphate loaded LAM would leach bound phosphate, ca. 175 mg LAM loaded with ca. 3 mg phosphorus as phosphate per gram was incubated with shaking in 50 mL water for 24 hours. No phosphorus was detected in the leachate (detection limit=ca. 0.001 mg/L). A similar experiment with arsenic loaded LAM resulted in no detectable arsenic in the leachate. The highly irreversible nature of these associations has obvious commercial implications, among them a utility of LAM in continuous flow applications.

LAM may be regenerated to its original capacity by a simple treatment with alkali. This procedure was demonstrated by treating phosphate loaded LAMfor ten minutes in NaOH solutions ranging in concentration from 0.01% to 10.0%. These LAM samples were then rinsed two to three times in water and neutralized using 1N $HNO_3$. The ability of regenerated LAM to remove phosphate from water or seawater was essentially the same as that reported above for LAM that had not been previously used. Similar experiments with arsenic loaded LAM likewise demonstrated a complete restoration of capacity. The number of regeneration cycles that may be used depends on the characteristics of the lignocellulose used to manufacture the LAM. For example, whereas the structural characteristics of pelletized paper LAM were adversely affected by several cycles of use and regeneration, pelletized cotton LAM exhibited no such ill effects.

All the items discussed above are detailed explanations of the invention through examples for illustration only; therefore, they do not restrict the invention to themselves. Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims. For example, lignocellulose may be modified in a similar fashion by use of other elemental salts containing Mg, Ca, Mn, Mo, Co, Ni, or Zn, in addition to the Fe and Al described above. In addition, solid substrates other than lignocellulose may be employed, if they contain hydroxyl groups susceptible to the replacement reaction described above whereby LAM is manufactured.

Advantages.

The LAM manufactured by this inventon has a greater absorption capacity than that of any commercial absorption media, and is capable of producing effluents with substantially lower concentrations than those achievable by commercial media. Further, it is highly selective for arsenic and phosphate, making it practical to use in treatment of waters with high levels of other anions whose removal is not desired and which would only serve to decrease the capacity of the LAM. In addition, LAM efficiently removes As(III), which is problematic for nearly all other treatment technologies. Potential applications include but are not limited to removal of arsenic in groundwater and mine wastewater and removal of phosphate in freshwater, wastewater and sewage. Not only does LAM provide a simple yet effective treatment process for point source pollution, its capabilities indicate that it could be used with great success to remove phosphate or arsenic in cases of non-point source pollution, for which there are currently no practical treatment methods.

Moreover, LAM may be manufactured from natural materials such as perennial plants (trees) and annual plants (kenaf, rice straw and cotton), completely safe and harmless materials that will not generate secondary pollution. Because of the low costs of all manufacturing inputs, and of the simplicity of the manufacturing process, LAM is very cost effective to produce. Further, because it can be simply regenerated to its original absorption capacity and used multiple times, its use is made more economical still.

Closing.

The reader"s attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A process for treating a contaminated aqueous solution to remove one or more anionic contaminants therefrom, comprising:
   a. contacting the contaminated aqueous solution with a lignocellulose-based anion-adsorbing medium (LAM), wherein the LAM has been formed by the steps of:
      i. dissociating cations selected from the group consisting of Fe or Al, from their counterions by adding a chemical compound containing said cations to water and acidifying;
      ii. pellitizing a lignocellulose having hydroxyl groups (—OH);
      iii. combining the cations with said lignocellulose hydroxyl groups (—OH) by bringing the lignocellulose into contact with the solution of step (i) and incubating; and
      iv. catalyzing the chemical replacement of the lignocellulose hydrogens (H) of the hydroxyl groups of the lignocellulose with the cations to produce the LAM with a positive charge by exposing the lignocellulose of step (iii) to an alkaline fixing agent;
   b. contacting the LAM with the contaminated aqueous solution to enable the contaminants to be retained at the Fe or Al combined with the lignocellulose; and
   c. recovering a treated aqueous solution with reduced content of the one or more anionic contaminants.

2. The method of claim 1, wherein the one or more anionic contaminants is selected from the group consisting of phosphate and arsenic.

3. The method of claim 1, further comprising regenerating the LAM after its contact with the contaminated aqueous solution by treating the LAM with an alkaline solution to remove the one or more anionic contaminants from the LAM to which said one or more anionic contaminants have been retained, and subsequently neutralizing the LAM with an acid to prepare it for reuse.

4. The method of claim 1, wherein the lignocellulose is selected from the group consisting of wood, paper, and cotton.

5. A process for treating a contaminated aqueous solution to remove one or more arsenic anionic contaminants therefrom, comprising:
   a. contacting the contaminated aqueous solution with a lignocellulose-based anion-adsorbing medium (LAM), wherein the LAM has been formed by the steps of:
      i. dissociating cations selected from the group consisting of Fe, Al or Ca, from their counterions by adding a chemical compound containing said cations to water and acidifying;
      ii. pellitizing a lignocellulose having hydroxyl groups (—OH);
      iii. combining the cations with lignocellulose hydroxyl groups (—OH) by bringing the lignocellulose into contact with the solution of step (i) and incubating; and
      iv. catalyzing the chemical replacement of the lignocellulose hydrogens (H) of the hydroxyl groups of the lignocellulose with the cations to produce the LAM with a positive charge by exposing the lignocellulose of step (iii) to an alkaline fixing agent;
   b. contacting the LAM with the contaminated aqueous solution to enable the contaminants to be retained at the Fe, Al or Ca combined with the lignocellulose; and
   c. recovering a treated aqueous solution with reduced content of the arsenic anionic contaminants.

6. The method of claim 5, further comprising regenerating the LAM after its contact with the contaminated aqueous solution by treating the LAM with an alkaline solution to remove the arsenic anionic contaminants from the LAM to which the arsenic anionic contaminants have been retained, and subsequently neutralizing the LAM with an acid to prepare it for reuse.

7. The method of claim 5, wherein the lignocellulose is selected from the group consisting of wood, paper, and cotton.

* * * * *

UNITED STATES PATENT AND TRADEMARK OFFICE
CERTIFICATE OF CORRECTION

PATENT NO. : 7,311,842 B2  Page 1 of 1
APPLICATION NO. : 10/708001
DATED : December 25, 2007
INVENTOR(S) : Ju Young Kim It is certified that error appears in the above-identified patent and that said Letters Patent is hereby corrected as shown below:

Title Page: Insert

[30] Foreign Application Priority Date

Sept. 16, 2003 [KR] Republic of Korea......KR-10-2003-0064186

Signed and Sealed this

Sixth Day of May, 2008

JON W. DUDAS
*Director of the United States Patent and Trademark Office*